March 7, 1950  R. C. BRETZ  2,499,351
OPTICAL PROJECTION AND DISPLAY APPARATUS
Filed Dec. 12, 1945  2 Sheets-Sheet 1
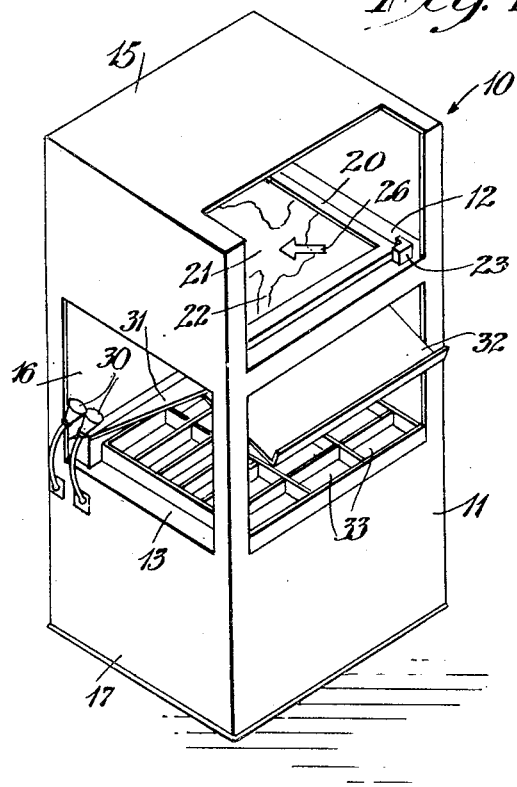
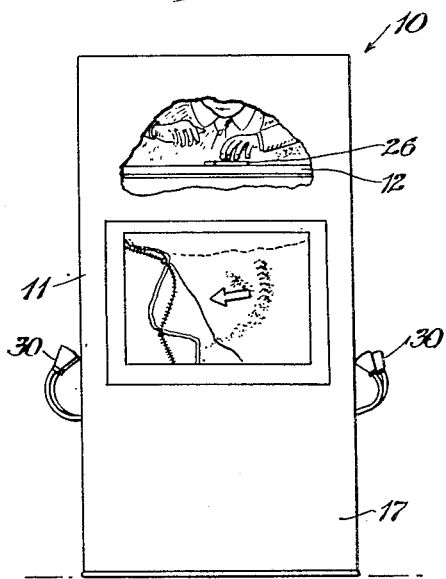
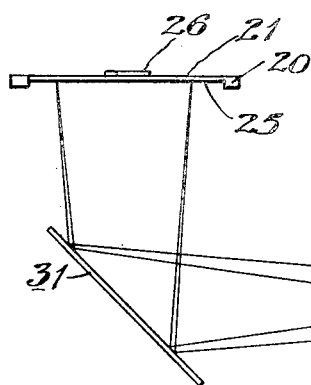
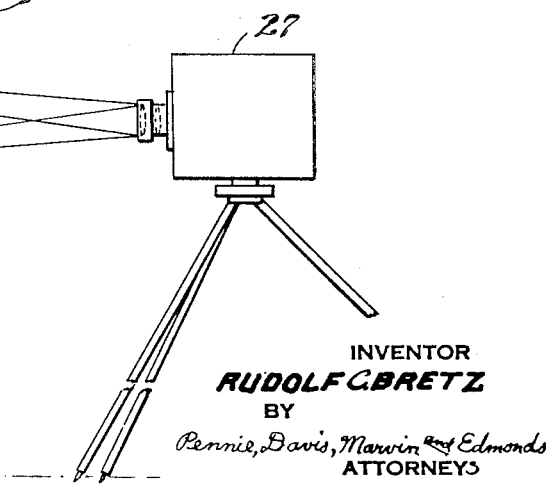
INVENTOR
*RUDOLF C. BRETZ*
BY
Pennie, Davis, Marvin and Edmonds
ATTORNEYS March 7, 1950  R. C. BRETZ  2,499,351
OPTICAL PROJECTION AND DISPLAY APPARATUS
Filed Dec. 12, 1945  2 Sheets-Sheet 2
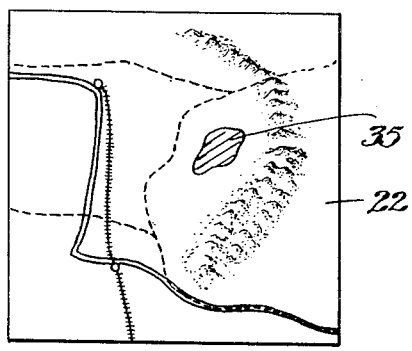
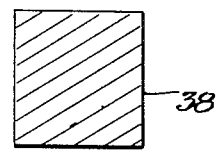
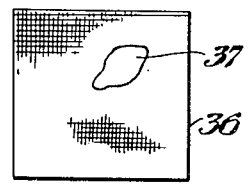
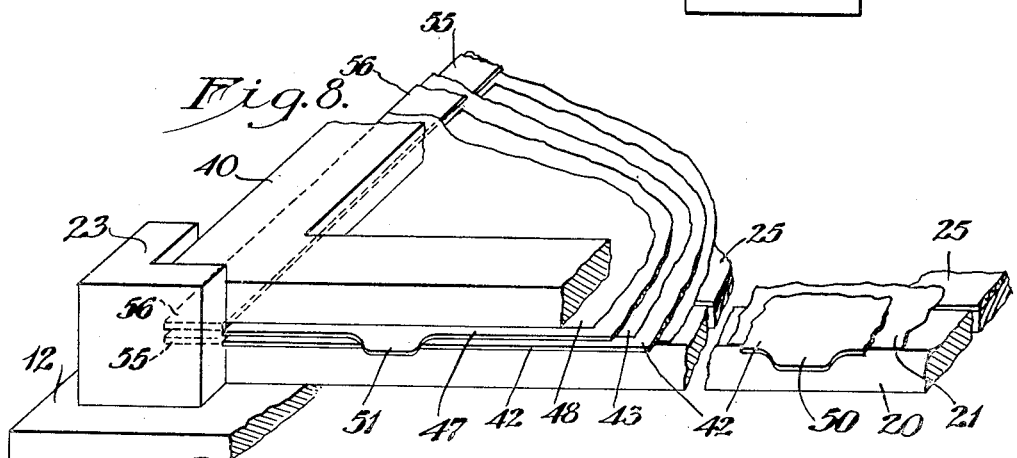
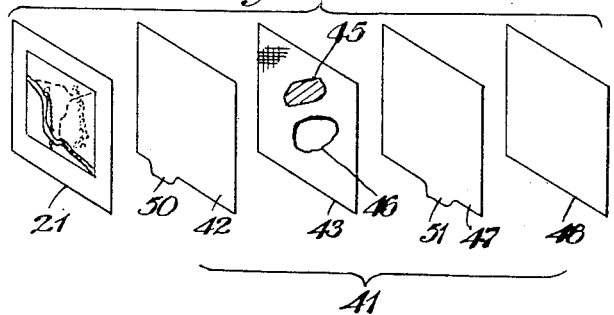
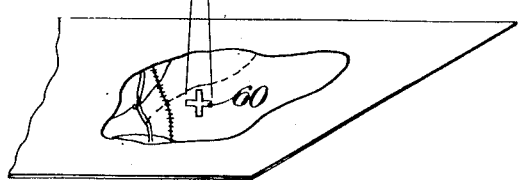
INVENTOR
RUDOLF C. BRETZ
BY
Pennie, Davis, Marvin and Edmonds
ATTORNEYS Patented Mar. 7, 1950

2,499,351

UNITED STATES PATENT OFFICE 2,499,351

OPTICAL PROJECTION AND DISPLAY APPARATUS

Rudolf C. Bretz, Croton-on-Hudson, N. Y., assignor to Columbia Broadcasting System, Inc., New York, N. Y., a corporation of New York Application December 12, 1945, Serial No. 634,588

5 Claims. (Cl. 88—24)

This invention relates to means for exhibiting composite scenes having elements which may be moved continuously or which may be made selectively visible against an unchanging or fixed background, particularly the exhibition of such scenes for purposes of television transmission, motion picture photography, and the like.

In the transmission and reproduction of images of stationary unchanging objects by television, such as drawings, maps and the like, it is frequently desirable to add a movable element to the scene, which may, for instance, take the form of an index positionable to indicate locations referred to by a commentator, or to cause symbols or designs illustrating or suggestive of various events, characters or conditions to appear and disappear, with or without motion thereof, in an otherwise unchanging scene or against an unchanging background. This is referred to as "animating" the picture. A similar effect of animation, usually involving a greater portion of the scene, is achieved in an animated motion picture cartoon and a method of animation which has application in the art of television will commonly find application to the animation of motion picture cartoons, although the converse is not necessarily true, as will be explained hereinafter.

It is an important object of the invention to provide means for animating a scene for purposes of television transmission or motion picture photography, in accordance with which a member representing a movable element of the scene may be displaced, continuously, relative to a representation of an unchanging element or elements of the scene, to effect a corresponding displacement of an image thereof in the viewed scene, without the means for manipulating or effecting the movement of such member being visible in the scene.

Another object is to provide means for exhibiting a scene, particularly a scene scanned by a television camera or photographed as a motion picture, in which selected elements appear and disappear under the control of an operator without the means for creating this effect appearing in the scene.

A further object is to provide animation in a television or motion picture scene by transmitting light through a translucent screen bearing the design of the unchanging elements of the scene to a light-reflecting surface or surfaces at the rear of the screen designed in accordance with the changeable elements of the scene, to cause the light reflected therefrom to form a bright area or areas in an image of the scene.

In the art of animated motion picture cartoons various so-called "stop motion" animation processes have been proposed and put into use, according to which a movable element of a scene is photographed in sequence against a stationary background in discrete positions, spaced closely enough so that motion of the element in the projected picture appears substantially continuous. As the change of the movable element from one position to another is made while the viewing means (the camera) is inactive, that is, while the shutter is closed, there is no limitation as to the elapsed time between the photographing of different phases of the motion. In television, on the other hand, because scanning and transmission are substantially continuous processes, motion in an animated scene cannot be stopped between different phases thereof and therefore the above referred to "stop motion" processes cannot be used in this art. The present invention, in one of its aspects, by providing for continuous instead of intermittent motion of the movable elements of an exhibited scene, is equally applicable to television transmission and to motion picture photography.

According to the general aspects of the invention a design to be animated, such as a map, is drawn or otherwise reproduced on a translucent screen which partially reflects and partially transmits and diffuses light incident on a surface thereof. Preferably, a greater portion of the incident light is transmitted by the material of the screen than is reflected from the surface. One material having the desired properties which has been used in carrying out the invention is a thin, translucent paper used by draftsmen for layout drawings.

The translucent screen bearing the design of the unchanging elements of the scene is supported, preferably in a horizontal position, in a cabinet and strongly illuminated from below. To produce an image in a vertical plane, a mirror inclined at 45 degrees to the screen is provided. Reflection of light from the walls of the cabinet above the drawing is substantially prevented by blackening the walls. The general tone of the scene, as viewed by the eye, is a grayish one whose depth is determined by the ratio of the portions of the incident light respectively transmitted and reflected by the screen.

If now a good reflecting surface, such as the surface of a piece of white cardboard, say, in the form of an arrow, is placed against the upper non-illuminated surface of the translucent screen, a bright image of the arrow will appear on the map due to light transmitted from the source through the screen and reflected from the cardboard back to the screen and to the viewing means. This bright image may be caused to move about the map at will by moving the cardboard arrow over the upper surface of the paper by the finger tips or by selective manipulative devices. The hands, preferably, are enclosed in black gloves and other manipulative means painted a dull black, to eliminate reflection therefrom.

Instead of a wholly bright movable image, one having contrasting light and dark portions may be produced, by drawing a design on the reflecting cardboard surface in black or other dark tone or by using white lines against a dark background. Lines or areas of a dark color will appear in the image of the scene in a tone approaching that of the general gray tone of the scene, black lines in particular appearing at this tone since substantially no light is reflected from them, while lines or areas with good reflecting properties will appear in a brighter tone.

For television or motion picture purposes, the image formed by the inclined mirror, is scanned or photographed by a camera. Since such camera is effectively focused on the translucent paper screen, any object appreciably displaced from the plane of the screen will be invisible to the camera, due both to being out of focus and to the diffusing properties of the screen. For example, no image of the cardboard arrow, even with its highly reflecting surface, will appear on the map, as scanned or photographed, while the arrow is removed from the screen a distance of the order of an inch or so or until contact between the surfaces is approached. The invisibility of an object in a plane only slightly removed from that of the paper is utilized in certain applications of the invention to effect the appearance and disappearance of an area or design in contrasting tone in the scene, by causing a suitably designed reflecting surface to approach and to recede from the screen, the diffusing properties of the screen making possible a gradual or a sudden appearance and disappearance of the image of the object depending on the rate of approach or recession of the object toward and away from the screen, respectively.

In other applications, an area or design to be added may be represented by a reflective surface substantially in contact with the screen which bears the invariable scene element, but initially hidden by an opaque non-reflective mask, to be revealed in the scene upon the removal of the mask. Furthermore, instead of utilizing the reflective properties of a surface or in combination with surface reflection, a bright image may be added to the scene by projecting it from the rear on the screen and, if desired, moving it about, to constitute a movable element of the scene.

Objects and advantages of the invention other than those referred to above will be apparent upon reading the following specification, to be considered in connection with the accompanying drawings in which:

Fig. 1 is a perspective view of a preferred embodiment of the optical means employed in animating a scene, in accordance with the invention;

Fig. 2 is a front elevational view of the means of Fig. 1 with a portion of the walls of the enclosing cabinet broken away to show the hands of an operator;

Fig. 3 is an enlarged view of a movable element of an animated scene;

Fig. 4 is a diagrammatic drawing showing the relation of a television or motion picture camera to a scene exhibited by the means of Fig. 1;

Fig. 5 is a drawing of a map on a screen showing a design which may be caused to be selectively visible in an image thereof, in accordance with the invention;

Fig. 6 is a drawing of a member bearing a design, a portion of which may be caused to be selectively visible on the map of Fig. 5;

Fig. 7 is an apertured mask used in connection with the means of Fig. 6;

Fig. 8 is an enlarged fractional view, in perspective, showing an assembly of display sheets and masks, together with mounting means therefore, used in connection with the apparatus of Fig. 1 to reveal an element or plurality of elements in a scene.

Fig. 9 is an exploded view, in perspective, showing the several sheets and masks therefor of the assembly of Fig. 8;

Fig. 10 is a diagrammatic drawing showing projection apparatus employed in accordance with the principles of the invention, for selectively adding a bright image in a scene.

Referring to Fig. 1, numeral 10 is applied generally to an image-forming apparatus comprising a cabinet 11 of rectangular cross-section divided vertically by shelves 12 and 13 into a partially enclosed top section 15, an open intermediate section 16 and a base section 17. Upper shelf 12 is adapted to support a removable frame 20 bearing a translucent screen 21 on which the unchanging background design of a scene to be exhibited is drawn or otherwise reproduced, such as map 22, preferably on the lower side thereof. Shelf 12 is apertured in accordance with the size of the screen and mounts locating means 23 permitting an additional frame or frames bearing screens and associated members to be stacked above frame 20 in registry therewith, as is referred to hereinafter.

Screen 21 is composed of translucent material, partially reflecting and partially transmitting light incident on a surface thereof, preferably a greater portion of the light being transmitted than is reflected. It is desirable, also, that the material have light diffusing properties. Thin, translucent layout paper has been found to be well suited to this use, although other materials having the above properties may be employed, for example, a sheet of transparent plastic material with a slightly matt surface to render it diffusing. The drawings to be animated may be line drawings either in a light or dark tone or may be wash or similar drawings rendered, preferably, in light tones. In any case the design on the screen must be carried out in a manner permitting light incident on the screen in the region of the designed area to pass in part through the screen.

Screen 21 in frame 20 may be self-supporting or may be supported on a transparent glass plate 25 to prevent distortion with respect to the focal plane of the viewing camera 27. On the upper surface of screen 21 there may be placed at appropriate times versions of the movable elements of the scene in the form of cut-outs of white cardboard or other material having a good light reflecting surface, with the reflecting surface substantially in contact with the screen, such as a representation of an arrow 26, an enlarged view of which is seen in Fig. 3. Preferably, the reflectivity of the reflective surface of the movable element is higher than that of the screen.

The enclosing walls of upper section 15 of cabinet 11 are partially cut away to provide space for the arms and hands of the operator, seen in Fig. 2, when manipulating the cut-outs of the movable elements over screen 21 or performing similar functions and the interior surfaces of the remaining portions of the walls are rendered substantially non-reflective, as by being painted a dull black.

Electric lights 30, which may have light concentrating means, such as reflectors or lenses, provide the source of the light incident on the lower surface of screen 21. A mirror 31 mounted in intermediate section 16 of the cabinet is preferably inclined to screen 21 at an angle of 45 degrees to form a vertical image of map 22, together with a changeable element or elements of the scene, when visible, as is seen in Fig. 2. A script board 32 may be provided for the convenience of the commentator or operator. Also, base section 17 may support trays 33 in which the various cut-outs used in different parts of a program may be stored.

In the operation of the means thus far described for adding a movable element to the scene, with screen 21 in place and illuminated by lights 30 and if little or no reflection occurs from objects above the screen, the image of the map, when drawn in black, formed by mirror 31 appears as a series of black lines on a light gray field. When white cardboard arrow 26 is placed in contact with the upper surface of the screen, the greater portion of the light transmitted through the screen to the lower surface of this object is reflected therefrom, producing a bright image or area in the scene in sharp contrast to the gray tone of the background. Should a non-reflecting, e. g. black, area or line be present on the reflecting surface of the cut-out, such line or area appears in the image of the scene as a gray tone contrasting with the remainder of the area. Thus, when designs other than uniformly-bright areas are to appear or are to move about in the scene they may be drawn either in a dark non-reflective tone on a white, reflective background, or in white or other light tone on a dark background.

In manipulating the cut-outs to cause their images to move about the scene, the hands of the operator, if bare, would be nearly invisible to the camera because of being out of focus and masked by the object moved and because of the light diffusing properties of the screen. To render them completely invisible black gloves are preferably worn.

The image of map 22 or other basic design may be caused to change in appearance in various ways, within the scope of the invention, having in common the production of an area of enhanced brightness therein.

One modification of the invention for causing designs or symbols to appear in the viewed scene and to disappear therefrom at will, is to bring a reflecting surface bearing the design or contoured in accordance with the symbol into contact with screen 21 and, when desired, subsequently to remove said reflecting surface from contact therewith. For example, a cardboard cut-out in the form of a bomb burst may be positioned in contact with screen 21 to cause a bright image thereof to appear at a selected location in map 22, which may later be caused to disappear or "fade out" by withdrawal of the cut-out from the screen, the hands of the operator or any manipulative devices used being invisible for reasons hereinbefore stated. A wide variety of effects may be achieved by combining the selective appearance of objects or areas and their displacement in the scene.

Another modification of the invention which may be employed to add a design to the scene, for example, to cause a bright area 35, with shading thereon, to appear in the image of map 22 is to prepare a mask 36, Fig. 7, of thin black paper, with an aperture 37 coextensive with the significant area, which may be placed on the upper, non-illuminated surface of screen 21 without being visible in the scene, since the black mask and black walls of top section 15 of cabinet 11 will absorb light transmitted through the screen substantially in like degree. With the aperture in mask 36 in registry with the area of map 22 which is to appear shaded, a design display sheet, for example, a piece of white cardboard 38 bearing the shading in black, or of black cardboard bearing the non-shaded portions of the area in white, Fig. 6, may be placed over the mask and area 35 will then appear in the scene in a brighter tone than before, due to the additional reflected light, with contrasting dark shading. In this method the contour of the design is determined by the cut-out portion of the mask, while the shading on member 38 may be of indefinite extent, so long as it can at least fill cut-out area 37. By shifting mask 36 about on the upper surface of screen 15 the shaded area may be positioned at will in the scene.

Means relating to a further modification of the invention permitting the revealing of an object or contrasting area or a succession of objects or areas in a scene, are illustrated in Figs. 8 and 9. In Fig. 8 there is shown superimposed upon frame 20 bearing screen 21, a second frame 40 registered with frame 20, as by locating means 23 on shelf 12. Frame 40 may bear a single screen or design display sheet designed in accordance with an element to be selectively visible in the viewed scene or, as illustrated, may bear what will be termed a "pack" 41 comprising design display sheets and masks cooperative therewith, these several members being more clearly identified in the exploded view of Fig. 9.

In Fig. 9 the members of pack 41 from left to right, corresponding to their order from the bottom to the top of the pack as seen in Fig. 8, are, first, a displaceable continuous black mask 42, followed by a design display sheet 43 preferably opaque, having a black border portion 44 and a portion 45 having the contour of a first area or object to be revealed in the scene and having a uniformly highly reflective, for example white, surface or bearing a design in contrasting tones, one of which preferably provides an area of higher surface reflectivity than that of screen 21. In the figure the illustrated design is one of black shade lines on a white background. A portion 46 of sheet 43 may be cut out to the contour of a second object or area to be added to the scene. Sheet 43 is followed by a second displaceable continuous black or non-reflective mask 47 which in turn is followed by a display sheet 48 which may, for example, be a sheet of plain white cardboard or other opaque material with a reflective surface, or may bear a design in contrasting tones, such as black and white. The image formed by reflection from sheet 48 appears in the scene with the contour thereof determined by the contour of aperture 46 in sheet 43. It will be obvious that a pack of the described character formed by alternate displaceable masks and apertured sheets bearing designed areas, with the sheet furthest removed from the source of illumination lacking an aperture or, if apertured, backed by a non-reflective surface, may be built up to any desired extent limited only by the increasing distance from screen 21 of the reflective surface furthest from said screen and the source of illumination, it being desirable that this last reflective surface be not too far removed from the focal plane of the camera, which is substantially the plane of screen 21.

The several described members mounted on frame 40, preferably, are all of thin material and are closely stacked. Masks 42 and 47 may have tabs 50 and 51, respectively, projecting from corresponding edges thereof and the pack is preferably mounted so that the masks may be withdrawn from the pack with the aid of these tabs, individually or in combination, without disturbing the other members of the pack.

Such a mounting may be that shown, by way of example, in Fig. 8, wherein masks 42 and 47 are seen to be of lesser width than frame 40 and normally to project slightly beyond an edge of the frame, with clearance between the lateral edges of the masks and locating means 23. The projecting edges of the masks, which carry tabs 50 and 51, respectively, are preferably located at the side of the apparatus nearest the operator. A pair of spacing members, 55, 56 is attached, one below the other, to the bottom of frame 40 at the left side thereof, as seen in Fig. 8, and a corresponding pair of spacers, not shown, is similarly attached at the right side of the frame. These spacers may extend continuously along the side members of the frame or may be interrupted, as desired. Lower spacer 55 and its corresponding opposite member rest on the upper surface of frame 20, or of screen 21 mounted on said surface, to provide vertical space for the free displacement, forwardly and backwardly, of mask 42 and may guide the mask in its displacement. Display sheet 43 is mounted between spacers 55 and 56. Upper spacer 56 and its opposite provide clearance space, and, if desired, guidance for mask 47. Display sheet 48 is mounted between spacer 56 and frame 40. In the figure the thickness of the spacers and masks is exaggerated and certain other dimensions distorted, for clearness of illustration.

In the operation of the last-described embodiment of the means of the invention, with mask 42 in place above screen 21, that is, substantially in contact with the surface of screen 21 remote from the source of illumination, the image of map 22 will appear to the camera as drawn, that is, as a design of lines against a background of uniform tone. Withdrawal of mask 50 permits light transmitted through screen 21 in the area of the map to be reflected from area 45 of sheet 43 and a bright image of this area will then appear in the scene with contrasting gray lines included therein, if dark lines are included in area 45, as is illustrated.

Since light passing from the source through the cut-out portion 46 of sheet 43 is absorbed by the black surface of the succeeding mask 47 when this mask is in place, light transmitted through cut-out portion 46 will then produce no effect of an area of enhanced brightness in the scene. Upon the withdrawal of mask 47, however, light transmitted through cut-out portion 46 strikes sheet 48 and upon being reflected therefrom causes a second bright area to appear in the scene having the contour of cut-out 46. Thus by the successive withdrawal of masks 42 and 47 two areas or designs, having at least significant portions thereof of greater brilliancy than the surrounding areas, may be added to the scene in sequence and it will be clear that additional uniformly bright areas of selected contour or areas having significant portions thereof of enhanced brilliancy may be added to the scene by employing additional masks and display sheets in a similar manner.

In addition to reflecting light from an object whose image is to be added to the scene, an area of increased brightness corresponding to the object may be produced by projection. This may take the form either of contact projection, as when a light source having a mask with an aperture in the form of the desired bright area is placed directly on the map, or by projection in the usual sense where an image is formed by a lens system and thrown on the screen from a distance. For example, in Fig. 10 a bright image of a cross 60 is shown projected on screen 21 from projector 61 which may be movable to cause the bright image of the cross to move correspondingly in the scene. Such effects may be combined with the described effects due to reflection, within the scope of the invention.

While a preferred method and apparatus for carrying out the invention have been described herein and shown in the drawings, it will be understood that these are by way of illustration, the invention being limited only by the appended claims.

I claim:

1. In apparatus for exhibiting an image of an animated picture, a cabinet, a partition extending across said cabinet including a window comprising a translucent screen bearing a design of the unanimated elements of the picture, the walls of the cabinet on one side of said partition being of non-reflective character, a light source for illuminating the other side of said partition including said screen, an object or objects having surfaces corresponding in character to the animated elements of the picture and of a higher reflectivity than the illuminated surface of said screen positioned with said reflecting surfaces adjacent said screen to reflect light transmitted therethrough, and a mirror mounted in said cabinet on the illuminated side of said window and extending at a substantial angle thereto.

2. In apparatus for exhibiting an image of an animated picture the combination of a cabinet having a horizontal apertured shelf dividing the cabinet into upper and lower portions, respectively, the walls of said upper portion having substantially non-reflecting interior surfaces and having an opening therein to admit manipulative means, a mirror mounted in said lower section inclined substantially at 45 degrees to said shelf, a translucent screen extending over said aperture and bearing a design of the unanimated elements of the picture, a cut-out of an animated element of the picture supported on and movable relative to said screen by said manipulative means, said cut-out having a surface in contact with the screen of higher reflectivity than that of the screen, and a source of illumination for the lower surface of said screen.

3. In apparatus for exhibiting an image of an animated picture, a cabinet having a horizontal apertured shelf dividing the cabinet into upper and lower portions, respectively, the walls of said upper portion having substantially non-reflecting interior surfaces and having an opening therein to admit the hands of an operator, a mirror mounted in said lower section and inclined substantially at 45 degrees to said shelf, a translucent screen extending over said aperture and bearing a design of the unanimated elements of the picture, a member designed in accordance with an animated element of the picture supported above and adjacent said screen, and a source of illumination for the lower surface of said screen, whereby light from said source transmitted through said screen and reflected from said member produces an image thereof in the scene viewed in said mirror.

4. In apparatus for projecting and viewing, the combination of a translucent screen bearing a design of an unchanging element of a scene, a source of illumination for one side of said screen to render said design visible by light reflected therefrom, and a member bearing a pattern corresponding to a changeable element of the scene placed on the other side of the screen to reflect light from said source after the transmission thereof through said screen, to thereby selectively enhance the brilliancy of an area of said designed portion of the screen as viewed from said one side.

5. In apparatus for television and the like the combination of a translucent screen bearing an invariable element of a variable design, said invariable design element being rendered in a manner permitting light to pass through the screen in the region thereof, a source of illumination for said screen, a pack of thin sheet members adjacent the non-illuminated surface of said screen comprising alternate displaceable and stationary members serving, respectively, as masks and design display sheets, said masks each having a substantially non-reflective surface facing said source and said display sheets each having reflective areas of respective surfaces thereof facing said source, each of said display sheets except the sheet furthest removed from said source having an aperture registering with a portion of said reflective area of the succeeding sheet, whereby upon displacing said masks in suitable sequence areas of enhanced brightness having the contours of said apertures, respectively, and constituting variable elements of the scene are caused to appear in the scene.

RUDOLF C. BRETZ.

REFERENCES CITED

The following references are of record in the file of this patent:

UNITED STATES PATENTS

| Number | Name | Date |
| --- | --- | --- |
| 1,227,075 | Rowntree | May 22, 1917 |
| 1,247,227 | Cooper | Nov. 20, 1917 |
| 1,260,221 | McCormick | Mar. 19, 1918 |
| 1,261,648 | Terry | Apr. 2, 1918 |
| 1,456,233 | Hammond et al. | May 22, 1923 |
| 1,742,680 | Artigue | Jan. 7, 1930 |
| 1,821,626 | Fleischer | Sept. 1, 1931 |
| 1,945,926 | Tolhurst | Feb. 6, 1934 |
| 1,965,875 | Behymer | July 10, 1934 |
| 2,181,405 | Kosa | Nov. 28, 1939 |
| 2,210,333 | Kroner | Aug. 6, 1940 |
| 2,281,033 | Garity | Apr. 28, 1942 |